Figure 1:
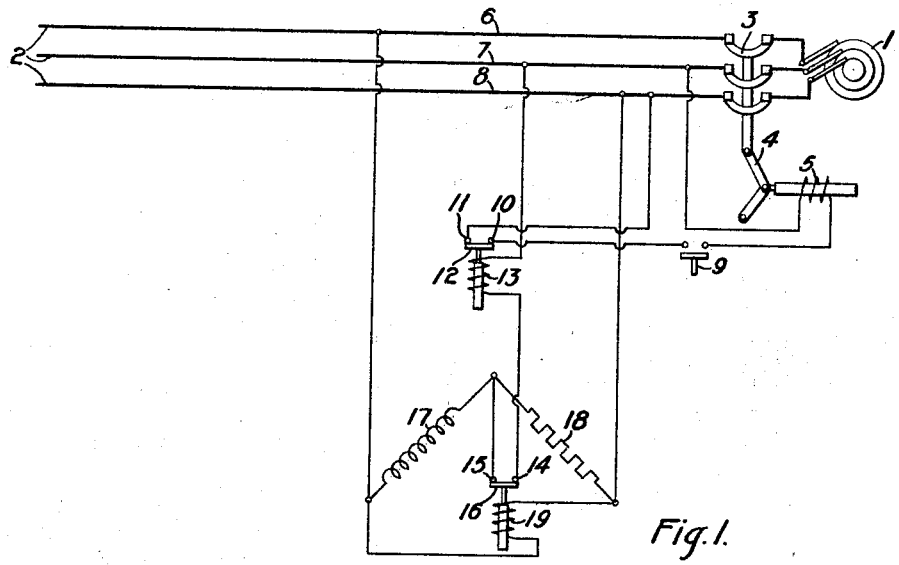

April 27, 1926.

W. C. GOODWIN

RELAY

Original Filed Nov. 11, 1919

1,582,678

WITNESSES:
H. J. Shelhamer
J. E. Foster

INVENTOR
Walter C. Goodwin
BY
Wesley G. Carr
ATTORNEY

Patented Apr. 27, 1926.

1,582,678

UNITED STATES PATENT OFFICE.

WALTER C. GOODWIN, OF PITTSBURGH, PENNSYLVANIA, ASSIGNOR TO WESTINGHOUSE ELECTRIC & MANUFACTURING COMPANY, A CORPORATION OF PENNSYLVANIA.

RELAY.

Application filed November 11, 1919, Serial No. 337,127. Renewed October 7, 1924.

*To all whom it may concern:*

Be it known that I, WALTER C. GOODWIN, a citizen of the United States, and a resident of Pittsburgh, in the county of Allegheny and State of Pennsylvania, have invented a new and useful Improvement in Relays, of which the following is a specification.

My invention relates to electrical protective devices and particularly to reverse-phase and phase-failure protective devices.

One object of my invention is to provide a reverse-phase protective device that shall be adapted to prevent a reversal of the normal direction of rotation of a motor in the event of a phase-reversal in the supply circuit of the motor.

Another object of my invention is to provide a phase-failure protective device that shall permit a motor to continue a cycle of its normal operation but shall preclude its re-connection to the supply circuit after it has stopped, in case one conductor accidentally becomes open-circuited, as by the blowing of a fuse, while the motor is in operation.

A further object of my invention is to provide a reverse-phase and phase-failure protective device for an electrical circuit that shall be simple and rugged, inexpensive to construct and effective in its operation.

The effect of a phase reversal in a polyphase-motor circuit is a reversal in the direction of rotation of the motor. This reversal in the direction of rotation may lead to personal peril and to serious damage to the motor-driven machinery. This danger obtains, for example, where a polyphase motor operates an elevator or a hoist.

If one phase of a ployphase circuit, supplying energy to a polyphase motor for an elevator or a hoist, should be open-circuited accidentally, as by the blowing of a fuse in that phase,, the motor would continue to operate as a single-phase motor until a stop was made at the landing that was being approached by the elevator or the hoist. The motor could then be reconnected to the supply circuit but could not start as a single-phase motor, and, if it were kept so connected for a considerable length of time, might be burned out.

In view of the above, I provide an auxiliary circuit comprising a reactor, a relay and a resistor connected in star relation to the supply circuit. The circuit of the relay is completed through two contacts of an auxiliary relay, when that relay is energized. The coil of the auxiliary relay is connected between the two phases that are connected to the resistor and the reactor, respectively. Two contact members of the main relay complete a circuit, when the relay is energized, for energizing a closing coil on a circuit-interrupter that controls the supply circuit to a motor. While the phase rotation of the supply circuit is normal, the current traversing the reactor and that traversing the resistor are very nearly in phase, and, combining vectorially, form a third current having a value that energizes the coil of the main relay sufficiently to cause the actuation of the relay. The contact members of the relay are now bridged, and the circuit of the closing coil of the circuit interrupter may be completed through a master control switch, and the motor energized. A phase reversal will so change the vector relation of the currents traversing the reactor and the resistor that they will be substantially out of phase. The two current values will then be subtractive, and the current value of the vector sum will not energize the relay coil sufficiently to actuate the relay. The circuit-interrupter therefore, cannot be closed, because the circuit of its closing coil is open at the contact members of the main relay, and the motor cannot be connected to the supply circuit.

Figure 2:
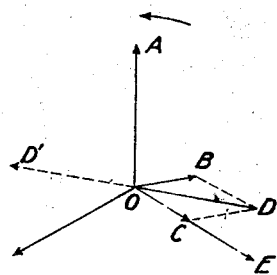
Figure 3:
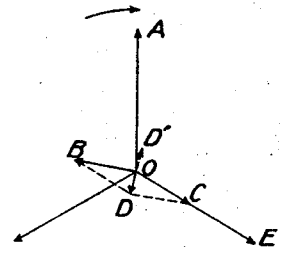

Figure 1 is a diagrammatic view of a circuit embodying my invention, and Figs. 2 and 3 are diagrams illustrating the phase relations of the currents traversing the various portions of the protective device embodying my invention.

In Fig. 1 of the accompanying drawings, a motor 1 is supplied with currents from a polyphase supply circuit 2 through a circuit-interrupter 3. The toggle mechanism 4 of the circuit-interrupter 3 is actuated upon the energization of a holding or actuating coil 5. A circuit for energizing the coil 5 is completed from the conductor 7 of the polyphase supply circuit 2, through the coil 5, a master switch 9, and two contact members 10 and 11 of a relay 12, to the conductor 8 of the circuit 2. The coil 13 of the relay 12 is connected from the conductor 7 to the contact member 14 of an auxiliary relay 16. Another contact member 15 of the auxiliary relay 16 is connected to the common terminal of a reactor 17 and a resistor 18. The other terminals of the reactor 17 and the resistor 18 are connected to the conductors 6 and 8, respectively. The coil 19 of the relay 16 is connected across the last-mentioned terminals of the reactor 17 and the resistor 18.

In Figs. 2 and 3 of the accompanying drawings, the line OA represents the voltage across the reactor 17, the line OB the current traversing the same; the line OE the voltage across the resistor 18 and the line OC the current traversing the same; the line OD the resultant of the two currents OB and OC; and the line OD' the current traversing the coil 13 of the relay 12. Fig. 3 illustrates the vector relations for a condition where one phase has been reversed. The current vector OB is shown lagging behind its corresponding voltage vector OA because of the reactance of the reactor 17 while the current vector OC of the current traversing the resistor 18 is in phase with its voltage OE.

When conditions are so nearly normal in the polyphase supply circuit 2 that the correct phase rotation 6—7—8 and the normal voltage obtain the currents traversing the reactor 17 and the resistor 18 will combine, as shown in Fig. 2, to a value OD, sufficient to energize and actuate the relay 13, and the voltage across the phase 6—8 will energize the auxiliary relay 16 to complete the circuit of the coil 13 to actuate the relay 12. If the master switch 9 is now closed, the holding coil 5 of the circuit-interrupter 3 is energized, and the circuit-interrupter 3 is closed through its mechanism 4. The circuit-interrupter 3 will remain closed so long as the relay 12 is energized and the master switch 9 is closed.

When a phase reversal occurs, the phase rotation reverses, thus placing the reactor current and the resistor current substantially out of phase, as shown in Fig. 3. The resultant current OD is too small in value to energize the relay 12, and therefore, cannot cause the completion of the circuit for energizing the closing coil 5 of the circuit-interrupter 3. The motor 1, therefore, cannot be connected to the supply circuit 2 while a phase reversal obtains.

If a phase-failure should occur, such as a conductor becoming open-circuited, because of the blowing of a fuse, the motor 1 would continue to operate as a single-phase motor and complete the operating cycle. The relays in the auxiliary circuit would remain energized and maintain the circuit interrupter closed because a circuit would still be completed from the auxiliary circuit through the motor windings, to the other conductors of the supply circuit. An elevator, for example, would not, therefore, be left between adjacent landings. After having stopped, however, the motor cannot be re-connected to the supply circuit so long as one conductor of the circuit remains open. If the conductor 6 or the conductor 8 is open, the auxiliary relay 16 will not operate, and, therefore, the relay 12 cannot be energized and the circuit-interrupter 3 cannot be closed. If conductor 7 is opened, again the relay 12 cannot be energized and the circuit-interrupter 3 cannot be closed.

My invention, therefore, provides a protective device that will protect motor-driven machinery from damage caused by a reversal in the direction of rotation of the driving motor, and that will also protect the motor from a burn-out such as might be caused by connecting it to a polyphase supply-circuit with one phase open-circuited.

I claim as my invention:

1. In a polyphase circuit, the combination with a relay and circuit interrupter having a holding coil, of a reactor and a resistor so connected in star relation to said polyphase circuit that, under normal conditions, the currents traversing the reactor and the resistor combine to actuate said relay, said relay being adapted to energize the holding coil of said circuit interrupter under normal conditions in said polyphase circuit, and to deenergize the holding coil of said circuit interrupter upon an occurrence of either a phase failure or a phase reversal in said polyphase circuit.

2. In a polyphase circuit the combination with a circuit interrupter, of a relay, a reactor and a resistor connected in star relation to said polyphase circuit, of means for actuating the relay, said relay actuating said circuit interrupter under abnormal conditions in said polyphase circuit, and a second relay connected across the phases to which said reactor and resistor are connected and adapted, when energized, to complete a circuit for energizing said circuit-interrupter-actuating relay.

3. In a polyphase electric circuit, the combination with an electrical apparatus and connecting means between the apparatus and the circuit, of means for controlling the effectiveness of the connecting means comprising two devices having different impedance characteristics and a relay, means for connecting the two devices across one phase of the circuit and means responsive to the voltage of said phase for controlling the connection of the junction of said impedance devices in circuit with said relay to another phase conductor of said circuit.

4. In a polyphase electric circuit, the combination with an electrical apparatus and a switch provided with a holding coil between the apparatus and the circuit, of a relay, a plurality of star-connected impedances including a winding of said relay and two other devices having unlike impedance characteristics so connected to the circuit that the relay is subjected to potential under normal conditions and normally-closed contact members controlled by said relay and disposed in the circuit of said holding coil.

In testimony whereof, I have hereunto subscribed my name this 30th day of October 1919.

WALTER C. GOODWIN.